(12) United States Patent
Kim et al.

(10) Patent No.: US 8,433,206 B2
(45) Date of Patent: Apr. 30, 2013

(54) BURST-MODE OPTICAL RECEIVER AND TIMING CONTROL METHOD

(75) Inventors: Jong Deog Kim, Daejeon (KR); Quan Le, Gwangju (KR)

(73) Assignee: Electronics and Telecommunications Research Institute, Daejeon (KR)

(*) Notice: Subject to any disclaimer, the term of this patent is extended or adjusted under 35 U.S.C. 154(b) by 295 days.

(21) Appl. No.: 12/905,329

(22) Filed: Oct. 15, 2010

(65) Prior Publication Data
US 2011/0129233 A1 Jun. 2, 2011

(30) Foreign Application Priority Data
Nov. 30, 2009 (KR) .................. 10-2009-0116850

(51) Int. Cl.
*H04B 10/06* (2006.01)
(52) U.S. Cl.
USPC .......................................... 398/210; 398/209
(58) Field of Classification Search ............... 398/202, 398/208–210
See application file for complete search history.

(56) References Cited

U.S. PATENT DOCUMENTS

| 5,430,766 | A | 7/1995 | Ota et al. |
| 7,304,543 | B2 | 12/2007 | Ivry |
| 2004/0190914 | A1 | 9/2004 | Kang et al. |
| 2008/0056732 | A1* | 3/2008 | Nishimura et al. ........... 398/202 |
| 2008/0310861 | A1 | 12/2008 | Wong et al. |
| 2011/0311227 | A9* | 12/2011 | Ossieur et al. .................. 398/58 |

FOREIGN PATENT DOCUMENTS

| KR | 10-0537901 B | 12/2005 |
| KR | 1020080111402 A | 12/2008 |
| WO | 2007042507 | 4/2007 |

OTHER PUBLICATIONS

Nakamura, Makoto et al., "1.25-Gb/s Burst-Mode Receiver ICs With Quick Response for PON Systems"; vol. 40, No. 12; pp. 2680-2688; Dec. 2005; IEEE Journal of Solid-State Circuits.

* cited by examiner

*Primary Examiner* — Leslie Pascal
(74) *Attorney, Agent, or Firm* — Kile Park Reed & Houtteman PLLC

(57) ABSTRACT

A burst-mode optical receiver and a timing control method are provided. The receiver receiving the burst-mode optical signal includes a transimpedance amplifier (TIA) for receiving a single current information signal and converting the single current information signal into a single voltage signal, a differential signal converter for converting the single voltage signal, received from the TIA, into differential signals, and an automatic offset control limiting amplifier (AOC-LA) for automatically controlling and amplifying an offset of the differential signals. The receiver further includes a gain controller for generating a gain value control signal based on an intensity of a burst packet of the single voltage signal to control a gain value of the TIA, and a burst detector for receiving the differential signals, detecting burst packets, and generating a burst detection signal for the start timing of each of the burst packets.

8 Claims, 4 Drawing Sheets

BURST-MODE OPTICAL RECEIVER AND TIMING CONTROL METHOD

CROSS-REFERENCE TO RELATED APPLICATION

This application claims priority to and the benefit of Korean Patent Application No. 10-2009-0116850 filed in the Korean Intellectual Property Office on Nov. 30, 2009, the entire contents of which are incorporated herein by reference.

BACKGROUND OF THE INVENTION (a) Field of the Invention

The present invention relates to a burst-mode optical receiver and a timing control method.

(b) Description of the Related Art

In a communication environment of a point-to-multipoint (P2MP) method such as a passive optical network, one optical line termination (OLT) unit is basically connected to an optical terminal apparatus on the subscriber's side which is represented by an optical network unit (ONU) or an optical network terminal (ONT) through a splitter. In such a communication method, a downstream from the OLT is broadcasted to all the ONTs, whereas upstreams from the respective ONTs must be received by the OLT in a time division multiplexing (TDM) method of a burst packet.

The above upstream transmission method is also called a time division multiplexing access (TDMA) method, and it requires an appropriate burst-mode optical receiver for the purpose of communication. The burst-mode optical receiver is required to have a fast response characteristic and a wide dynamic range, and to maintain high reception sensitivity for a variety of input intensities which vary according to each packet.

Passive optical networks (PON) techniques of a TDMA method which are now commercially available include an Ethernet PON (EPON) technique and a gigabit capable passive optical network (G-PON) technique. The standard for EPON provides a laser on/off function in order to avoid collision between packets. To this end, the standard defines the time domain having a maximum of 400 ns.

The standard for GPON provides higher transmission efficiency than EPON and so permits a guard time domain up to a minimum of 25.7 ns between burst packets. Further, the standard for GPON defines a preamble time of 44 bits (35.4 ns) on the basis of 1.25 Gbit/s, which is the time in which a receiver output can be stabilized and phase/frequency synchronization can be stabilized (i.e., a CDR lock).

Because of a difference in the above standard requirements, fast reset and fast stabilization response characteristics are required for every burst packet signal. To this end, a media access controller (MAC) for GPON controls the burst packets according to a series of standard protocol methods. Further, the MAC generates a reset signal between the burst packets and provides means for allowing the burst-mode optical receiver to be prepared to reset a state determined for a previous packet signal and to receive a next packet signal.

Signals transmitted by the transmitter of an ONT/ONU are inputted to the photodiode (PD) of an OLT receiver as digital optical signals of a burst packet form for TDMA. Further, current signals of an analog form, photo-electrically converted by the PD as in a general optical receiver, are converted into voltage signals by a trans-impedance amplifier (TIA), converted into differential signals that are insensitive to noise, amplified as digital electric signals having an appropriate voltage level whose logic 1 and 0 can be determined through a limiting amplifier (LA), and then stabilized and output.

In a series of the conversion processes, the burst-mode optical receiver for PON has to perform fast signal processing and stable level conversion for each of the burst packet signals having a different input intensity without the distortion of the signal, while fulfilling a timing condition required for the PON. Such an operating requirement characteristic is not simple in the burst-mode optical receiver for GPON which has to satisfy a short guard time and a preamble time.

That is, the burst-mode optical receiver for GPON requires a wide dynamic range and a fast response characteristic at the early stage of a burst and must use a step AGC method, together with a TIA gain digitalized according to the input intensity, rather than a consecutive automatic gain control (AGC) method which is chiefly used. Further, the burst-mode optical receiver for GPON must include an automatic offset control (AOC) function for a burst packet differential signal in order to efficiently control each circuit in synchronism with the input timing of an external reset signal and each burst packet.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a burst-mode optical receiver and a timing control method having advantages of receiving high-speed burst mode packet data generated in P2MP and TDMA communication methods, and amplifying, stabilizing, and outputting the packet data with appropriate timing.

An exemplary embodiment of the present invention provides a receiver for receiving a burst mode optical signal, including:

a trans impedance amplifier (TIA) for receiving a single current information signal, converting the single current information signal into a single voltage signal, and outputting the single voltage signal; a differential signal converter for converting the single voltage signal, received from the TIA, into differential signals and outputting the differential signals; an automatic offset control limiting amplifier (AOC-LA) for automatically controlling and amplifying an offset of the differential signals; a gain controller for detecting an intensity of a burst packet of the single voltage signal output by the TIA and generating a gain value control signal to control a gain value of the TIA; a burst detector for receiving the differential signals output by the differential signal converter, detecting burst packets, and generating a burst detection signal for a start time of each of the burst packets; and a controller for receiving an externally inputted MAC reset signal, the gain value control signal, and the burst detection signal and generating control signals for controlling the TIA, the gain controller, the burst detector, and the AOC-LA.

Another exemplary embodiment of the present invention provides a method of a receiver receiving a burst-mode optical signal and controlling the timing of a control signal, including:

generating a reset signal having a certain time width in synchronism with a rising edge of an externally inputted MAC reset signal; generating a gain control window signal having a first time width in synchronism with a rising edge of a burst detection signal that shifts from a low voltage level to a high voltage level at a point of time at which a burst mode packet is received after the reset signal is generated; generating a gain control signal during the first time width of the gain control window signal; generating an AOC reset signal, having a time width that is a second time width longer than the first time width, based on the gain control window signal; and generating a squelch signal, having a falling edge after a time width that is a third time width longer than a time width in which the first time width and the second time width are added, in synchronism with the rising edge of the MAC reset signal.

DETAILED DESCRIPTION OF THE EMBODIMENTS

Figure 1:
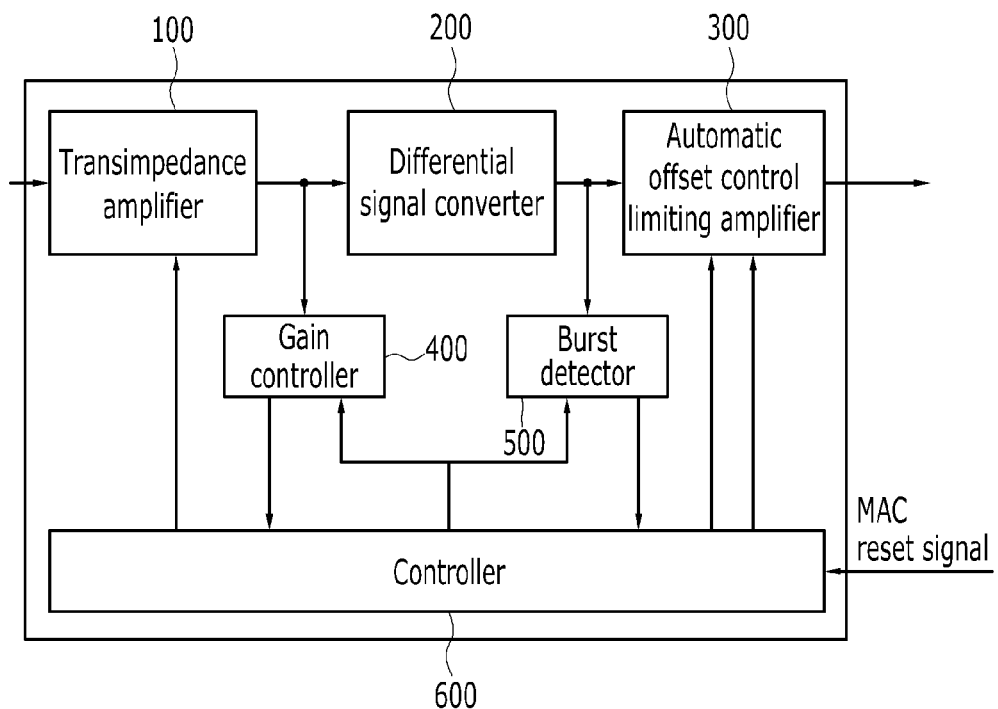
FIG. 1 is a configuration diagram showing a burst-mode optical receiver according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, unless explicitly described to the contrary, the word "comprise" and variations such as "comprises" or "comprising" will be understood to imply the inclusion of stated elements but not the exclusion of any other elements.

Hereinafter, a burst-mode optical receiver and a timing control method according to some exemplary embodiments of the present invention are described with reference to the accompanying drawings.

First, FIG. 1 is a configuration diagram showing the burst-mode optical receiver according to an exemplary embodiment of the present invention.

As shown in FIG. 1, the burst-mode optical receiver includes a transimpedance amplifier (TIA) 100, a differential signal converter 200, an automatic offset control limiting amplifier (AOC-LA) 300, a gain controller 400, a burst detector 500, and a controller 600.

The TIA 100 converts a received single current information signal into a single voltage signal without information distortion. Further, when converting the single current information signal, including burst mode packet information, into the single voltage current signal, the TIA 100 performs gain conversion within several nanoseconds in synchronism with a gain control signal output by the controller 600.

The gain controller 400 detects the intensity of the single voltage signal output by the TIA 100 and generates a gain value control signal for TIA gain control. That is, the gain controller 400 detects the intensity of the single voltage signal output by the TIA 100. Further, the gain controller 400 generates the gain value control signal for converting or maintaining a gain value within the TIA 100 in relation to the single voltage signal having a signal intensity at or near a preset reference level and outputs the generated gain value control signal to the controller 600.

The gain value control signal generated by the gain controller 400 becomes a reset state in synchronism with an internal reset signal that is operated in conjunction with the rising time of an external MAC reset signal inputted to the controller 600. Further, the gain controller 400 generates a gain value control signal for determining the gain control value of the TIA 100 during a corresponding burst packet period according to the intensity of an initial signal of each burst packet (i.e., an initial single voltage signal of a preamble signal).

The differential signal converter 200 converts the single voltage signal, received from the TIA 100, into differential signals and outputs the differential signals. That is, the differential signal converter 200 converts the single voltage signal into the differential signals, each swinging to a positive pole or a negative pole at a high voltage level and a low voltage level (i.e., two voltage levels). Each burst mode packet has a different voltage difference between the two lines of the differential signals output by the differential signal converter 200. Accordingly, it is necessary to minimize the offset before amplification.

The AOC-LA 300 automatically controls an offset and performs a limiting amplification function for the differential signals output by the differential signal converter 200. Further, the AOC-LA 300 squelches for output control and an output control function for determining an output level having a preset intensity.

That is, the AOC-LA 300 performs an automatic offset cancellation (AOC) function of automatically canceling a voltage difference between the intermediate values of a swing voltage sequentially for the differential signals, an amplification function of amplifying the differential signals from which an offset has been canceled, a function of controlling the output timing of a burst packet signal that has been amplified, converted, and stabilized, and a function of determining an output voltage level.

The burst detector 500 receives the differential signals from the differential signal converter 200, detects burst packets from the differential signals, and generates a burst detection signal for the start timing of each burst packet. Accordingly, signals of all the input intensities, indicating a reception sensitivity having a preset reference reception sensitivity or more, can be effectively operated.

The controller 600 is composed of circuits including a timer. The controller 600 receives the externally inputted MAC reset signal, the gain value control signal from the gain controller 400, and the burst detection signal from the burst detector 500. Further, the controller 600 generates control signals, including a gain control signal, an internal reset signal, an AOC reset signal, and squelch signals for controlling the TIA 100, the gain controller 400, the burst detector 500, and the AOC-LA 300, respectively, so that automatic gain control and automatic offset control are completed at an appropriate time during the initial period of a preamble in synchronism with the burst detection signal and a stabilized burst packet signal can be output.

Here, the external MAC reset signal is received before a new burst packet is started after one burst packet is terminated. The controller 600 and the signals inputted to or output from the controller 600 are described with reference to FIGS. 2 and 3.

Figure 2:
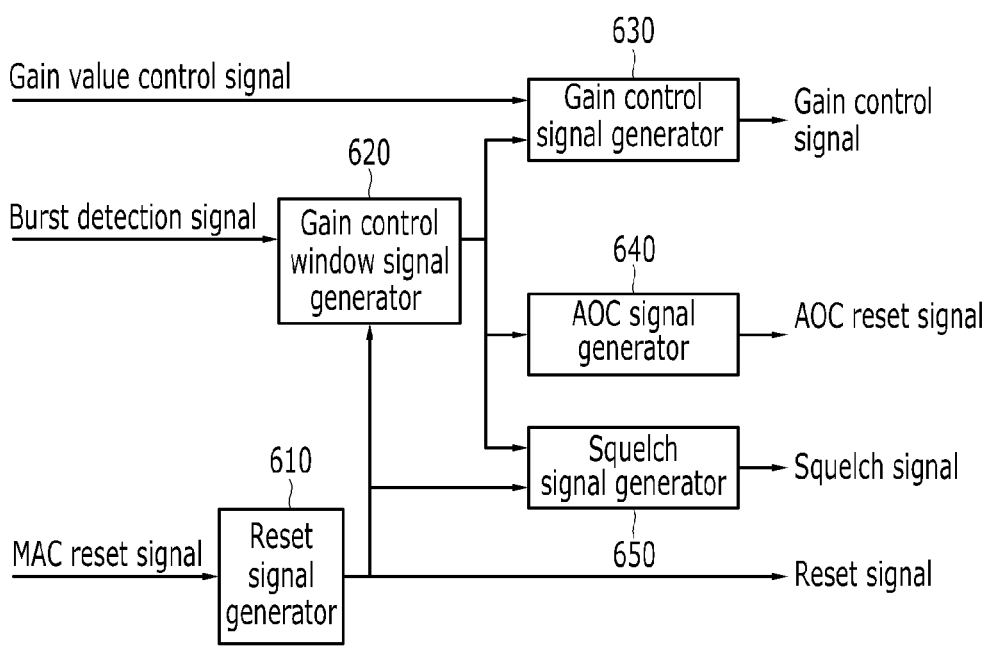
FIG. 2 is a configuration diagram showing the logic controller of the burst-mode optical receiver according to an exemplary embodiment of the present invention.
Figure 3:
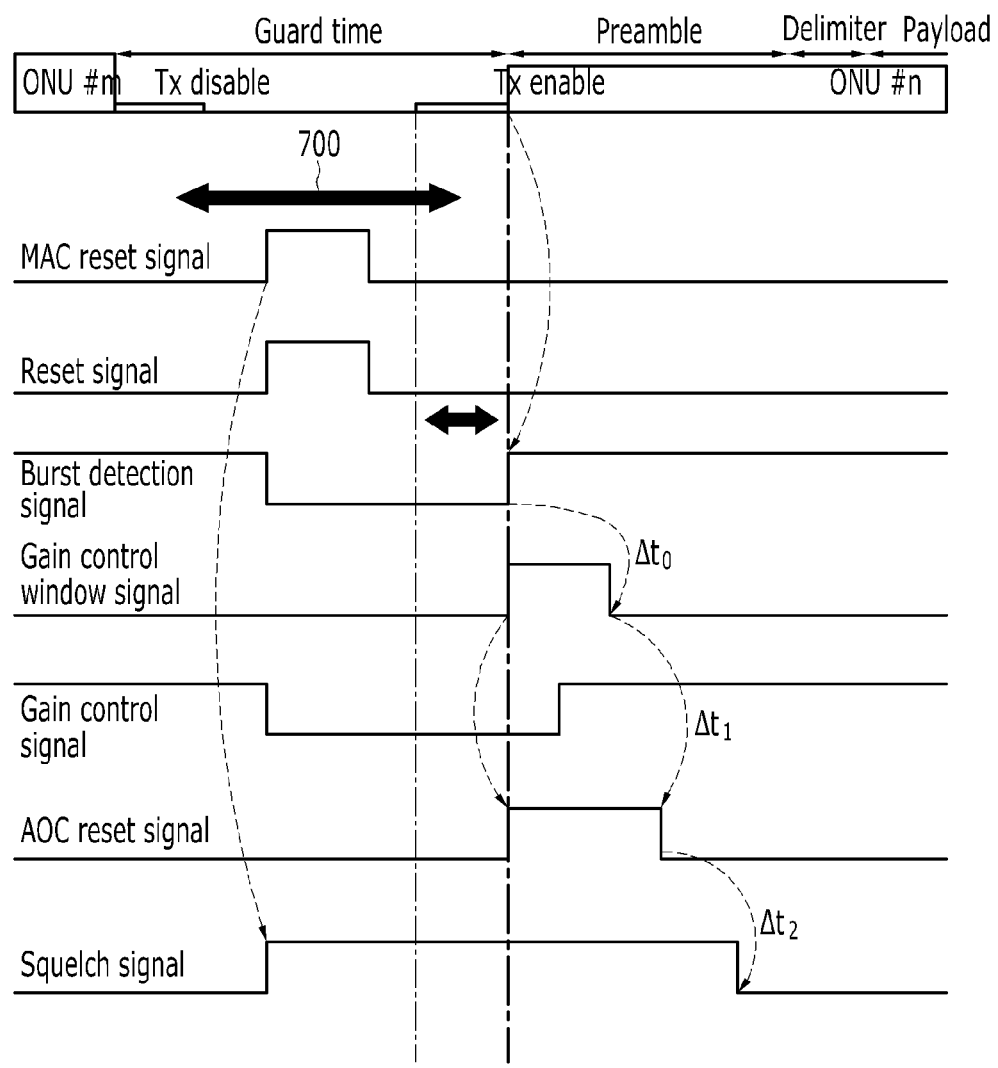
FIG. 3 is an exemplary view showing timing control of the burst-mode optical receiver according to an exemplary embodiment of the present invention.

FIG. 2 is a configuration diagram showing the logic controller of the burst-mode optical receiver according to an exemplary embodiment of the present invention, and FIG. 3 is an exemplary view showing timing control of the burst-mode optical receiver according to an exemplary embodiment of the present invention.

First, as shown in FIG. 2, the controller 600 includes a reset signal generator 610, a gain control window signal generator 620, a gain control signal generator 630, an AOC signal generator 640, and a squelch signal generator 650.

The reset signal generator 610 generates a reset signal for the internal circuits of the controller 600, and copies the MAC reset signal or generates the reset signal having a certain width in synchronism with the rising edge of the MAC reset signal. Further, in the case in which the burst-mode optical receiver is initially powered on, the reset signal generator 610 can generate the reset signal even without the MAC reset signal.

Here, the MAC reset signal inputted to the reset signal generator 610 is an externally inputted signal to control the burst-mode optical receiver so that it can be reset to a certain state. In particular, the MAC reset signal has a rising edge and a falling edge during the guard time period between the burst packet signals, as in the MAC reset signal of FIG. 3.

The gain control window signal generator 620 includes a timer function circuit for performing a timer function. The timer function circuit includes a circuit for generating a pulse having a certain width, and logic element circuits. The timer function circuit is described in detail below. The gain control window signal generator 620 generates a gain control window signal having a certain time width $\Delta t_0$ in synchronism with the rising edge of a received burst detection signal.

Here, the burst detection signal is generated by the burst detector 500, and it shifts to a high voltage level in synchronism with a time at which a burst mode packet is started, as in the burst detection signal of FIG. 3. The burst detection signal is reset to a low voltage level in response to the reset signal.

The gain control signal generator 630 receives the gain value control signal generated by the gain controller 400 and a gain control window time generated by the gain control window signal generator 620. Further, the gain control signal generator 630 generates a gain control signal during the time width $\Delta t_0$ of the gain control window signal and outputs the generated gain control signal. Here, the gain control signal is generated so that it can control the gain conversion of the TIA 100 only when the gain value control signal shifts from a low voltage level to a high voltage level.

Accordingly, in the case in which the shift of the gain value control signal is generated during the period of the gain control window signal, the gain value control signal and the gain control signal have the same signal form. However, in the case in which the shift of the gain value control signal is generated outside the period of the gain control window signal, the gain control signal remains in the off state so that the TIA 100 can be operated under basic gain conditions. Here, the gain value control signal is generated by the gain controller 400.

As shown in the example of the gain control signal shown in FIG. 3, when the burst packet of a single voltage signal generated by the TIA 100 has a certain intensity or more, the burst packet shifts from a low voltage signal to a high voltage signal and maintains a voltage state until it is reset by the reset signal.

The AOC signal generator 640 generates an AOC reset signal having a time width that is $\Delta t_1$ longer than the time width $\Delta t_0$ on the basis of the gain control window signal output by the gain control window signal generator 620 and outputs the generated AOC reset signal to the AOC-LA 300.

The AOC reset signal inputted to the AOC-LA 300 is controlled so that an AOC function circuit part thereof is in the reset state during a corresponding time width.

The AOC reset signal is controlled so that the falling edge thereof is delayed by the certain time width $\Delta t_1$ as compared with the width of the gain control window signal. To this end, the AOC signal generator 640 includes a timer function circuit. The timer function circuit controls the AOC-LA 300 so that it can perform the AOC process in the differential signal state after the TIA 100 stably performs the gain control process during the period of the gain control window signal.

Accordingly, the AOC reset signal generated by the AOC signal generator 640 shifts from a low voltage level to a high voltage level in synchronism with the falling edge of the gain control window signal, thus being capable of having the time width $\Delta t_1$. This method can be selectively used depending on the time that it takes to reset the AOC function circuit part and on how quickly the receiver has to be stabilized during the initial period of a preamble.

The squelch signal generator 650 receives the reset signal and the gain control window signal and generates a squelch signal having a width from the rising edge of the MAC reset signal to a falling edge subsequent to the time widths $\Delta t_0 + \Delta t_1 + \Delta t_2$ at the rising edge of the burst detection signal. The squelch signal generator 650 also includes a timer function circuit.

The squelch signal is inputted to the AOC-LA 300, and is then controlled so that unstable signals generated during the gain conversion process of the TIA 100 and the AOC process of the AOC-LA 300 are not output after reset.

FIG. 3 is described below. As shown in FIG. 3, a Tx disable period indicates a time period during which the transmitter of an ONU #m is disabled (i.e., an off state). A Tx enable period indicates a time period during which the transmitter of an ONU #n is enabled (i.e., an on state). The requirements for overhead times, such as the guard time period between the ONU #m and the ONU #n, the initial preamble signal period of a burst packet signal generated by the ONU #n, and a delimiter signal period, have already been defined in the standardization document.

Further, a case in which the burst detector 500 detects a point of time at which the burst packet signal is started (i.e., a point of time at which the preamble signal is started) and generates the rising edge of the burst detection signal has been described as an example. However, a signal intensity of a zero level, generated during the time for which the ONU enables the transmitter during the Tx enable period, can be higher than a reception sensitivity level of the receiver.

In this case, the rising edge of the burst detection signal may be generated at a certain point of time during the Tx enable period. Accordingly, a signal width of the gain control window signal, which is generated in conjunction with the rising edge of the burst detection signal and determines the times of the AOC reset signal and the reset signal, is controlled so that the automatic gain control operation in the TIA 100 and the AOC operation in the AOC-LA 300 are performed during the initial period of a preamble.

Further, in FIG. 3, an arrow denoted by reference numeral 700 indicates that a general position range of the MAC reset signal (i.e., the rising edge and falling edge of the MAC reset signal) received outside the burst-mode optical receiver during the guard time period can be placed at a certain position of the guard time period.

For portions where a series of the control signals (i.e., the reset signal, the burst detection signal, the gain control window signal, the gain control signal, the AOC reset signal, and the squelch signals) are operated in conjunction with each other, a description of portions for time delay generated by the operations of the internal circuits is omitted.

In general, a delay time of several nanoseconds can exist between the rising edges of the reset signal and the squelch signals that are operated in conjunction with the rising edge of the MAC reset signal. However, a series of the conjunction relationships between the control signals (i.e., a correlation in which the rising edges of the gain control window signal and the AOC reset signal are generated in synchronism with the rising edge timing of the burst detection signal) are the same.

Further, in the exemplary embodiment of the present invention, a correlation between the control signals has been described by taking, as an example, the signals of a high level, having a certain time width, on the basis of a voltage stage of a low level. However, the present invention can be operated according to the same mechanism by taking, as an example, signals of a low level, having a certain time width, on the basis of a voltage state of a high level.

Each of the gain control window signal generator 620, the AOC signal generator 640, and the squelch signal generator 650 of the controller 600 includes the timer function circuit for generating the control signal having a certain time width. The timer function circuits have the same structure. However, the timer function circuit of the gain control window signal generator 620 receives the burst detection signal as the input. The timer function circuits of the AOC signal generator 640 and the squelch signal generator 650 receive the gain control window signal as the input. The timer function circuit is described below with reference to FIG. 4.

Figure 4:
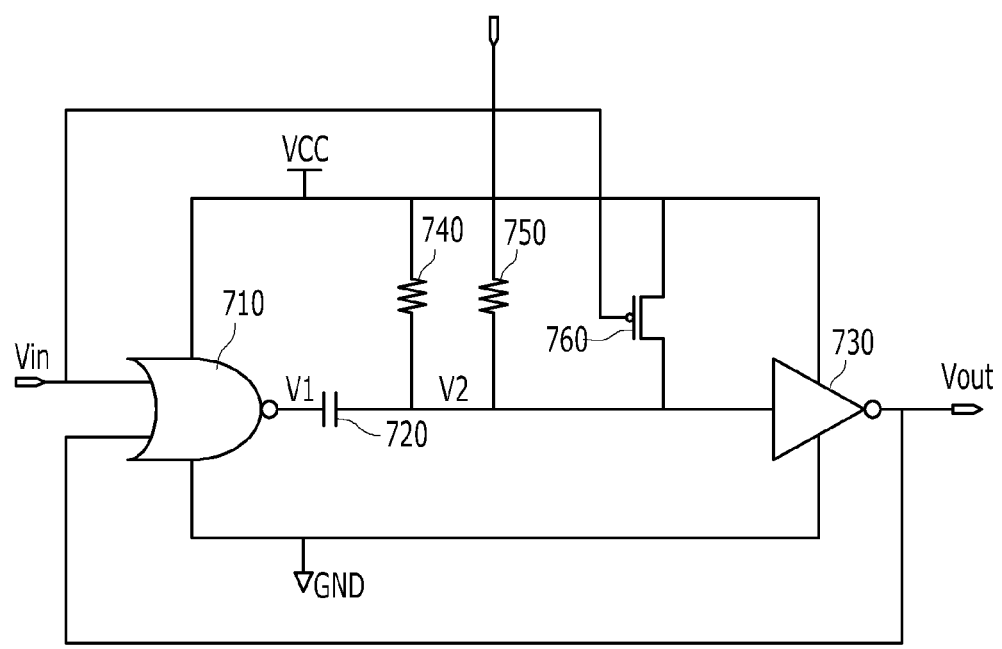
FIG. 4 is an exemplary view showing a timer function circuit according to an exemplary embodiment of the present invention.

FIG. 4 is an exemplary view showing the timer function circuit according to an exemplary embodiment of the present invention.

As shown in FIG. 4, the timer function circuit includes a NOR gate 710, a capacitor 720, a first resistor 740, a second resistor 750, a transistor 760, and an inverter 730.

The NOR gate 710 has two input terminals. An input voltage Vin is inputted to one of the two input terminals, and the output terminal of the inverter 730 is connected to the other of the two input terminals. The NOR gate 710 is further connected to a power source voltage VCC for operation and a ground GND.

The capacitor 720 has one terminal connected to the output terminal of the NOR gate 710 and the other terminal connected to the input terminal of the inverter 730. The other terminal of the inverter 730, having one terminal connected to the output terminal of the capacitor 720, outputs an output voltage Vout. The inverter 730 is also connected to the power source voltage VCC for operation and the ground GND. Here, the output terminal of the capacitor 720 is connected to another input terminal of the NOR gate 710. The output voltage Vout is inputted to the NOR gate 710.

One terminal of each of the first resistor 740, the second resistor 750, and the transistor 760 are connected in parallel between the output terminal of the capacitor 720 and the input terminal of the inverter 730. The power source voltage VCC is supplied to the other terminal of each of the first resistor 740, the second resistor 750, and the transistor 760. Further, in the exemplary embodiment of the present invention, a PMOS transistor is used as the transistor 760. The input voltage Vin is inputted to the gate of the transistor 760.

In accordance with the operating principle of a basic one-shot circuit, as is well known in the art, when the input voltage Vin is in a low level, the output voltage V1 of the NOR gate 710 becomes a high level, and the output voltage V2 of the capacitor 720 becomes a high level according to the operation of the transistor 760. Accordingly, the output voltage Vout of the inverter 730 becomes a low level. Further, the output voltage Vout of the inverter 730 is connected to another input terminal of the NOR gate 710.

When the input voltage Vin shifts from a low level to a high level, the output voltage V1 shifts to a low level, and the output voltage also shifts to a low level according to the operation of the capacitor 720. Accordingly, the output voltage Vout of the inverter 730 shifts to a high level. Here, the output voltage Vout functions as the input to the NOR gate 710. Accordingly, the output voltage V1 of the NOR gate 710 maintains the low level, but the output voltage V2 changes to a value close to a high level that can switch the output voltage Vout of the inverter 730 to a low level after passage of a certain time because the capacitor 720 is charged through the first resistor 740.

In accordance with the basic one-shot circuit, a time width in which the output voltage Vout of the inverter 730 is in a high level is operated as a timer dependent on the switching threshold voltages of the capacitor 720, the first resistor 740, and the inverter 730.

Accordingly, the capacitor 720 is discharged so that the output voltage V2 can rapidly reach the power source voltage (VCC) level when the input voltage Vin shifts from a high level to a low level. Further, when the input voltage Vin shifts from a low level to a high level, the current path of the transistor 760 is shut off so that the one-shot circuit can be operated as a timer, such as that described above.

Moreover, the second resistor 750 that is capable of selectively controlling a time width of the timer externally is further added in parallel with the first resistor 740 for determining the time width of the timer. One node of the second resistor 750 is connected to the output voltage V2, and the other node of the second resistor 750 can be used in an external floating state or in a state in which it is connected to the power source voltage VCC. Further, another resistor can be added between the node and the power source voltage VCC in order to flexibly control a time width in which the output voltage Vout of the inverter 730 is in a high level.

In accordance with the above exemplary embodiments, burst packets having an input intensity of a wide area, required in a receiver for burst mode data, can be subject to differential conversion with fast and accurate timing, stably amplified, and then output.

The above exemplary embodiments of the present invention are not only implemented through methods and apparatuses, but may be implemented through a program for realizing a function corresponding to the construction according to the exemplary embodiment of the present invention or a recording medium in which the program is recorded. Such an implementation can be readily implemented by a person having ordinary skill in the art from the above description of the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A receiver for receiving a burst-mode optical signal, the receiver comprising:
a transimpedance amplifier (TIA) for receiving a single current information signal, converting the single current information signal into a single voltage signal, and outputting the single voltage signal;

a differential signal converter for converting the single voltage signal received from the TIA into differential signals, and outputting the differential signals;

an automatic offset control limiting amplifier (AOC-LA) for automatically controlling and amplifying an offset of the differential signals;

a gain controller for detecting an intensity of a burst packet of the single voltage signal output by the TIA and generating a gain value control signal to control a gain value of the TIA;

a burst detector for receiving the differential signals output by the differential signal converter, detecting burst packets, and generating a burst detection signal for a start timing of each of the burst packets; and a controller for receiving an externally inputted MAC reset signal, the gain value control signal, and the burst detection signal, and generating control signals for controlling the TIA, the gain controller, the burst detector, and the AOC-LA, wherein the controller comprises:

a reset signal generator for receiving the MAC reset signal and generating a reset signal operating in conjunction with a rising edge of the MAC reset signal for controlling the controller;

a gain control window signal generator for generating a gain control window signal having a first time width based on the burst detection signal output by the burst detector;

a gain control signal generator for receiving the gain value control signal generated by the gain controller and a gain control window time generated by the gain control window signal generator, generating a gain control signal during the first time width, and outputting the generated gain control signal to the TIA;

an automatic offset cancellation (AOC) signal generator for receiving the gain control window time generated by the gain control window signal generator, generating an AOC reset signal having a time width that is a second time width longer than the first time width, and outputting the AOC reset signal to the AOC-LA; and a squelch signal generator for receiving the reset signal and the gain control window signal, generating a squelch signal having a time width in which the first time width, the second time width, and a third time width are added, and outputting the squelch signal to the AOC-LA.

2. The receiver of claim 1, wherein the reset signal generator generates the reset signal without receiving the MAC reset signal when it is powered on.

3. The receiver of claim 1, wherein the gain control window signal generator comprises:

a timer function circuit for generating a timing control signal in synchronism with the burst detection signal.

4. The receiver of claim 3, wherein the timer function circuit comprises:

a NOR gate configured to include a plurality of input terminals and one output terminal;

a capacitor connected to the output terminal of the NOR gate;

an inverter connected to an output terminal of the capacitor and configured to have an output terminal connected to any one of the input terminals of the NOR gate;

a first resistor configured to have one terminal connected between the output terminal of the capacitor and an input terminal of the inverter and another terminal connected to a power source voltage and to control a time width of a timer;

a second resistor configured to have one terminal connected between the output terminal of the capacitor and the input terminal of the inverter and another terminal connected to the power source voltage and to selectively determine the time width externally in parallel with the first resistor; and a transistor configured to have one terminal connected between the output terminal of the capacitor and the input terminal of the inverter, another terminal connected to the power source voltage, and yet another terminal connected to one of the input terminals of the NOR gate to which a power source is inputted, and to transfer an input voltage of the inverter.

5. The receiver of claim 1, wherein each of the AOC signal generator and the squelch signal generator comprises:

a timer function circuit for generating a timing control signal in synchronism with the gain control window signal.

6. The receiver of claim 5, wherein the timer function circuit comprises:

a NOR gate configured to include a plurality of input terminals and one output terminal;

a capacitor connected to the output terminal of the NOR gate;

an inverter connected to an output terminal of the capacitor and configured to have an output terminal connected to any one of the input terminals of the NOR gate;

a first resistor configured to have one terminal connected between the output terminal of the capacitor and an input terminal of the inverter and another terminal connected to a power source voltage and to control a time width of a timer;

a second resistor configured to have one terminal connected between the output terminal of the capacitor and the input terminal of the inverter and another terminal connected to the power source voltage and to selectively determine the time width externally in parallel with the first resistor; and a transistor configured to have one terminal connected between the output terminal of the capacitor and the input terminal of the inverter, another terminal connected to the power source voltage, and yet another terminal connected to one of the input terminals of the NOR gate to which a power source is inputted, and to transfer an input voltage of the inverter.

7. A method of a receiver receiving a burst-mode optical signal and controlling timing of a control signal, the method comprising:

generating a reset signal having a certain time width in synchronism with a rising edge of an externally inputted MAC reset signal;

generating a gain control window signal having a first time width in synchronism with a rising edge of a burst detection signal, which shifts from a low voltage level to a high voltage level at a point of time at which a burst mode packet is received after the reset signal is generated;

generating a gain control signal during the first time width of the gain control window signal;

generating an AOC reset signal, having a time width that is a second time width longer than the first time width, based on the gain control window signal; and generating a squelch signal having a falling edge after a time width that is a third time width longer than a time width in which the first time width and the second time width are added, in synchronism with the rising edge of the MAC reset signal.

8. The method of claim 7, further comprising, after generating the AOC reset signal, generating the AOC reset signal having the same time width as the second time width based on the gain control window signal.

\* \* \* \* \*